(12) United States Patent
Blank et al.

(10) Patent No.: US 8,158,299 B2
(45) Date of Patent: Apr. 17, 2012

(54) BIPOLAR PLATE AND FUEL CELL UNIT

(75) Inventors: Felix Blank, Constance (DE); Thomas Kunick, Illerkirchberg (DE); Markus Schudy, Ulm (DE)

(73) Assignee: Daimler AG, Stuttgart (DE)

( * ) Notice: Subject to any disclaimer, the term of this patent is extended or adjusted under 35 U.S.C. 154(b) by 977 days.

(21) Appl. No.: 12/128,356

(22) Filed: May 28, 2008

(65) Prior Publication Data

US 2009/0325036 A1 Dec. 31, 2009

Related U.S. Application Data

(63) Continuation of application No. PCT/DE2006/002134, filed on Nov. 30, 2006.

(30) Foreign Application Priority Data

Nov. 30, 2005 (DE) .................... 10 2005 057 045

(51) Int. Cl.
*H01M 8/02* (2006.01)
*H01M 8/24* (2006.01)

(52) U.S. Cl. .................. 429/457; 429/458; 429/514

(58) Field of Classification Search ............... None
See application file for complete search history.

(56) References Cited

U.S. PATENT DOCUMENTS 7,531,265 B2* 5/2009 Sugiura et al. ............... 429/434
7,846,613 B2* 12/2010 Sugiura et al. ............... 429/514

2002/0081477 A1 6/2002 Mclean et al.
2004/0038102 A1 2/2004 Beckmann et al.
2004/0209150 A1 10/2004 Rock et al.
2005/0186459 A1 8/2005 Sugiura et al.

FOREIGN PATENT DOCUMENTS

| DE | 100 15 360 A1 | 10/2001 |
|---|---|---|
| DE | 100 47 248 A1 | 4/2002 |
| DE | 101 13 001 A1 | 10/2002 |
| DE | 102 36 997 A1 | 3/2004 |
| DE | 102 47 010 A1 | 4/2004 |
| DE | 102 53 002 A1 | 6/2004 |
| EP | 1 653 543 A3 | 7/2006 |
| EP | 1 653 543 B1 | 10/2010 |
| JP | 2003-142126 A | 5/2003 |

OTHER PUBLICATIONS

International Search Report dated Jul. 23, 2007 with English translation (Thirteen (13) pages).

* cited by examiner

*Primary Examiner* — John S Maples
(74) *Attorney, Agent, or Firm* — Crowell & Moring LLP

(57) ABSTRACT

The invention relates to a bipolar plate for a fuel cell stack, which comprises at least a an anode-side sub-plate. An interior of the bipolar plate is enclosed by the sub-plates, with a fluid port area arranged having at least one fluid port, over which a fluid can be conveyed to the fluid channels. The fluid channels are arranged on at least one of the flat sides, as well as a manifold zone, over which the fluid can be distributed to its assigned fluid channels and an accumulation zone, over which the fluid can be carried away from the fluid channels to another fluid port area. At least one of the sub-plates has a uniform arrangement of raised support points in the manifold zone and/or accumulation zone. Apart from the peripherally situated support points, a negative support point of the same type is designed adjacent to each raised support point inside the manifold zone and/or the accumulation zone.

19 Claims, 6 Drawing Sheets

BIPOLAR PLATE AND FUEL CELL UNIT

This application is a continuation of International Application No. PCT/DE2006/002134, filed Nov. 30, 2006, the entire disclosure of which is herein expressly incorporated by reference, which claims priority under 35 U.S.C. §119 to German Patent Application No. 10 2005 057 045.3, filed Nov. 30, 2005.

BACKGROUND AND SUMMARY OF THE INVENTION

The invention relates to a bipolar plate and a fuel cell unit, and to a fuel cell that includes such a bipolar plate.

For mobile applications of fuel cells it is necessary to reduce the volume and size of the fuel cells (which are assembled as part of fuel cell stacks), to accommodate the narrow installation space conditions in vehicles, and to optimize the power density. The volume of the fuel cell stack is defined in essence by the height and/or the thickness of the bipolar plates, which are assembled as part of the fuel cell stack. For mobile applications they typically exhibit a thickness ranging from 0.9 to 1.2 mm. For non-mobile applications an even greater thickness is possible, since in this case the power density of the fuel cell stack is less relevant.

A typical thickness of a membrane electrode assembly (MEA) of the fuel cell is approximately 0.5 mm. Thus, approximately 65% of the cell block height of the fuel cell stack is defined by the height of the bipolar plates. Accordingly, attempts have been made to reduce even further the height of the bipolar plates, particularly in the area of the so-called flow field channels which, for example, convey the reaction fluids planarly to the membrane in the MEA. The cooling fluid carries away the reaction heat from the membrane area.

One difficulty encountered in reducing the height of the bipolar plates is that it is also necessary to reduce the installation height in the inflow areas of the fluids from the edge-sided ports to the actual fluid channels in order to be able to reduce the height of all of the bipolar plates. On the one hand, the inflow area should occupy as little space as possible; but, on the other hand, they should be large in order to guarantee a uniform distribution of the fluids. At the same time the inflow area must exhibit a very high rigidity and guarantee support for the MEA. This presents a problem for embossed bipolar plates, which are made, for example, of thin metal plates, because the fluids cross each other in the inflow area. This means that the height of the inflow area has to be reduced even further.

German patent document DE 100 150 360 A1 discloses a bipolar plate which achieves an intersection of fluids in thin bipolar plates so that a cooling fluid is conveyed obliquely over a right angled structure of the gas conveying channels. In this case the depth of the channel on the anode and cathode side can be reduced in the areas, in which the cooling fluid intersects.

Published U.S. Patent Application No. 2002/0081477 A1 discloses additional ways in which fluids can be distributed transversely, for example in a flow field, with parallel fluid channels. In this case the height of the opposite fluid channel is trimmed so that a transverse connection can be realized. However, there is the particular problem that it is necessary to have not only a gas distribution but also an additional cooling fluid distribution in the fluid channels.

One object of the invention is to provide a bipolar plate which has a negligible installation height and at the same time is especially rigid.

Another object of the invention is to provide such a bipolar plate which is especially suitable for the distribution of three fluids.

Similarly another object of the invention is to provide a fuel cell stack having a negligible installation height.

These and other objects and advantages are achieved by the bipolar plate according to the invention, which comprises two sub-plates, at least one of which has a uniform arrangement of raised, positive support points in the manifold zone and/or accumulation zone of said sub-plates. Apart from the support points situated near edges, a negative support point of the same type is designed adjacent to each raised positive support point inside the manifold zone and/or the accumulation zone. Such negative support point forms a free space for the fluid between the positive support points. It has been demonstrated that the regular configuration of support points and free spaces, for a uniform distribution of a fluid that is flowing through into the fluid channels of the bipolar plate, is especially advantageous. Furthermore, the support effect of the sub-plates in relation to each other is improved while at the same time optimizing the free spaces for the flowing fluid. Especially in the case of thin, embossed metallic bipolar plates and/or sub-plates the results are outstanding rigidity and support.

A pressure loss can be minimized if the support points are designed, according to an advantageous further development, as round or semi-spherical nubs. Due to the rounded shape it is possible to gently divert the flow. The nub shape represents an optimal contour from a flow engineering viewpoint. Furthermore, the shape is optimal for an embossing technique that is advantageous for the production of the thinnest stable bipolar plates. Due to the improved stability and/or rigidity of the embossed bipolar plate there is no need for an additional component to support the fuel cell membrane and/or the membrane electrode unit.

In a simplified embodiment of the invention, the support points exhibit a longitudinal, approximately elliptical cross section. Due to the resulting longitudinal characteristic of the support points and free spaces, the flow is advantageously in the preferred direction. Preferably adjacent support points are arranged at a varying angle to the fluid channels, in such a manner that the flowing fluid experiences a deflection in a preferred direction. This design is especially suitable for fluid ports at the corners of the bipolar plates, since an enhanced distribution of especially the most remote fluid channels can be achieved. It is desirable to assign the ellipsoid support points to the fluid ports near the corners.

If the directly adjacent positive and negative support points exhibit at least one continuous flank and form a honeycomb structure, the result is an especially rigid bipolar plate that is easy to emboss. In the case of a honeycomb structure the positive and negative nubs pass directly over into each other. In the extreme case, if it were not necessary for the edges to have a radius, the nubs in this embodiment would assume an octagonal cross section. Four sides would merge into a slope, the other end of which would pass over into the respective adjacent nub with the opposite (negative) orientation. The other four sides would be adjacent to a slope, the other side of which would pass over into a plane on the low level and would rise again to the next nub.

There is an additional improvement in the equipartition if the support points and the free spaces exhibit a higher flow resistance in the fluid port vicinity of an assigned fluid port than at a distance from the fluid port. Thus, the support points may be designed, as seen in the flow direction, with a larger diameter in the fluid port vicinity than at a distance from the fluid ports. As an alternative or in addition, the support points may be arranged, as seen in the flow direction, tighter in the fluid port vicinity than at a distance from the fluid ports.

An improvement in the equipartition of the fluids may be achieved if the flow of the fluid in the manifold zone and/or in the accumulation zone forms in essence a cross flow in relation to the fluid channels. The manifold zone and/or the accumulation zone advantageously taper off in the direction of flow.

If the manifold zone and the accumulation zone are asymmetrical to each other, the result is a uniform distribution of the respective fluid among the fluid channels. Fewer support points in the manifold zone and/or accumulation zone are necessary—for example, nubs between the sub-plates and between the fuel cell membrane and/or the MEA and the bipolar plate. The mechanical stability is increased. Furthermore, a better water discharge from the fuel cell stack is possible—for example, at a cold start of the assigned fuel cell system. The manifold zone and the accumulation zone should occupy as little area as possible, since they are usually not a part of the electrochemically active area of the fuel cell stack, and thus have a negative impact on the power density.

It is especially advantageous if the manifold zone and the accumulation zone are different in size, and if the manifold zone occupies less area on the sub-plate than the accumulation zone.

One advantageous further embodiment of the invention provides that at least one of the sub-plates has a passage opening, which makes it possible for the fluid to pass between the interior, enclosed by the sub-plates, and the respective flat side. A partially closed fluid guidance enables a compact design and maximum utilization of the installation height. The introduction of the fluids from the fluid port to the manifold zone and/or the discharge of fluids from the fluid channels of the flow field areas to the accumulation zone can take place without influencing the cross section of the channel and without having a negative effect on the fluid separation.

The passage opening is provided advantageously between the fluid port area and the manifold zone and/or between the accumulation zone and the exit-sided fluid port area.

In another advantageous embodiment, the at least one fluid port is surrounded by a circumferential sealing groove. In this way, with the configuration of circumferential sealing grooves on all existing fluid ports, it is possible to offset the grooves in the region of the desired fluid feed between the two sub-plates. It is desirable to select the offset as a function of the depth of the channel in order to guarantee a channel cross section that meets the minimum requirement.

If the sealing groove of the fluid port on the one sub-plate extends, at least in certain places, inside the sealing groove of the respective fluid port on the other sub-plate, then it is possible to guarantee sufficient tightness when the fuel cell stack is assembled, since the sealing grooves on the one sub-plate can be supported by the adjacent sub-plate and vice versa.

The sealing groove of the one sub-plate is supported advantageously by a support structure of the other sub-plate. The mechanical support of the sealing grooves occurs in an optimal manner by means of a structured adjacent sub-plate. This can be done especially advantageously with embossed structures. A good compromise can be found between the mechanical stability and a channel cross section that meets the minimum requirement.

In a further embodiment, a reliable separation of the fluids is achieved by locating a weld joint for joining the two sub-plates outside an area that is enclosed by the fluid port and the passage opening. Furthermore, there is no adverse effect on a circumferential sealing groove. It is practical to arrange the weld joint adjacent to the passage opening in the direction of the interior of the sub-plates.

A fuel cell stack according to the invention comprises a layered arrangement of fuel cells, which are separated by bipolar plates, and has at least one bipolar plate having one or more of the above described features.

Other objects, advantages and novel features of the present invention will become apparent from the following detailed description of the invention when considered in conjunction with the accompanying drawings.

BRIEF DESCRIPTION OF THE DRAWINGS

FIG. 2b shows a detail of a fluid infeed of a central fluid port in FIG. 2a;

DETAILED DESCRIPTION OF THE DRAWINGS

Figure 1A:
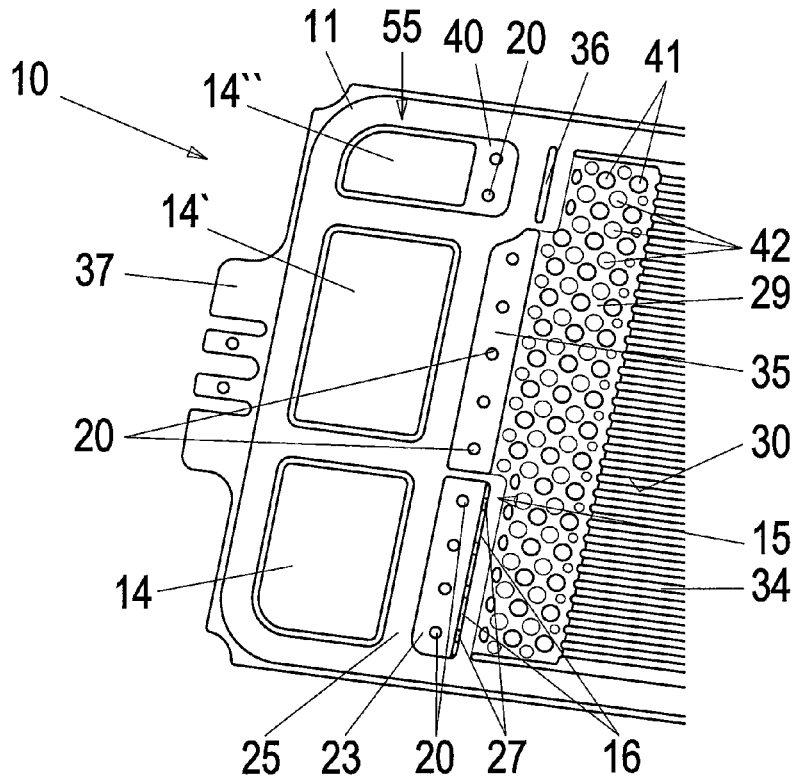
FIGS. 1a and 1b depict details in a top view of a first sub-plate of a preferred bipolar plate (a) and of a second sub-plate (b), which is assigned to the first sub-plate.

In the figures the same elements or elements having the same function are marked with the same reference numerals. In the event that there is a large number of elements of the same type, only individual ones of the elements of the same type are marked for the sake of a better overview.

Figure 1B:
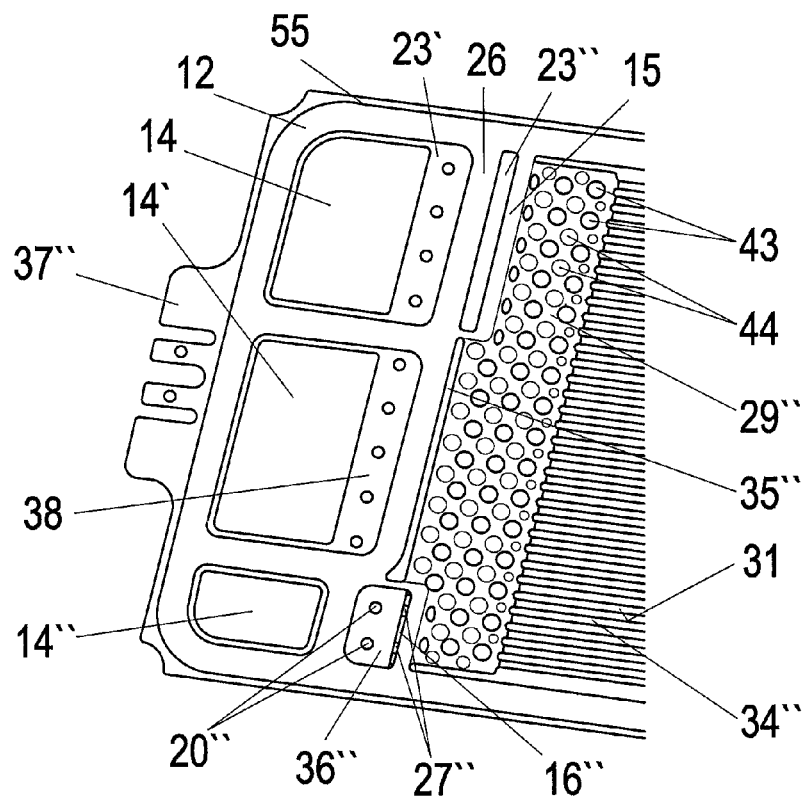

FIGS. 1a and 1b depict details of two sub-plates 11 and 12, which in the assembled state form a preferred bipolar plate 10 for a fuel cell stack. The bipolar plate 10 is used in the well-known manner as a separator plate between individual fuel cells. In this case they separate the fluid spaces of the adjacent fuel cells, and serve to mechanically support the ion conducting fuel cell membrane, which is made preferably of a polymer. According to a standard design, the fuel cell membrane is integrated into a so-called membrane electrode assembly (MEA).

Figure 4:
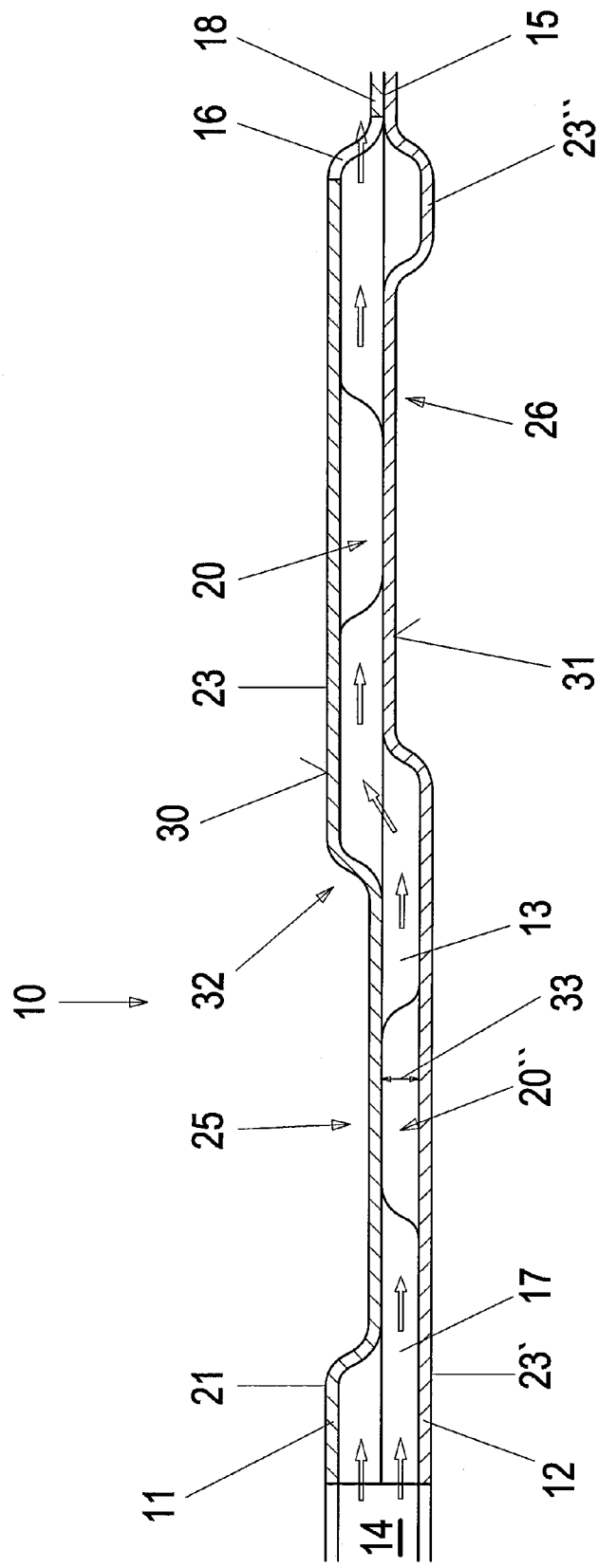
FIG. 4 is a lateral sectional view of a preferred bipolar plate in the area between the fluid port area and the manifold zone.

The preferred (assembled) bipolar plate 10, comprising an anode-side sub-plate 11 and a cathode-side sub-plate 12, has an upper side 30 on the sub-plate 11 and a bottom external side 31 on the sub-plate 12. The sub-plates 11, 12 enclose an interior 13 (FIG. 4). Located on the end there is an inlet-side fluid port area 55 of the bipolar plate 10 with three fluid ports 14, 14', 14". A fluid —for example, hydrogen, oxygen, and a coolant —can be supplied by means of each fluid port 14, 14', 14". The respective anode-side and/or cathode-side fluids can be fed to the fluid channels 34, 34"—the so-called flow field area —which are arranged on the side 30 of the anode-side sub-plate 11 and on the side 31 of the cathode-side sub-plate 12, whereas the cooling fluid flows preferably between the sub-plates 11, 12. An outlet-side fluid port area 56 of the bipolar plate (FIG. 6) conveys the fluids out of and/or away from the bipolar plate 10. Said fluid can also carry away the product water from the fuel cell reaction.

The contacts 37, 37" are mounted laterally. For example, the electrical voltage at the bipolar plate 10 may be tapped at these contacts.

Between the fluid port area 55 and the fluid channels 34, 34" there is a manifold zone 29, through which the fluid can be distributed to its assigned fluid channels 34, 34". Between the outlet-side fluid port area 56 and the fluid channels 34 there is a corresponding accumulation zone 50 (FIG. 6), which accumulates the fluid issuing from the fluid channels, and feeds it to the respective outlet-side fluid port. The flow of the fluid in the manifold zone 29 and/or in the accumulation zone 50 preferably forms essentially a cross flow to the fluid channels 34.

The respective fluid is then conveyed from the corner fluid port 14 between the sub-plates 11, 12 to a passage opening 16, through which the fluid reaches the side 30 and is distributed uniformly into the assigned fluid channels 34, via the manifold zone 29. The passage opening 16 is stabilized along its width with lands 27 and disposed in a flank of a raised portion 23. Upstream of the fluid channels a raised portion 36 is situated in front of the passage opening 16. Downstream of the passage opening 16 the sub-plate 12 has a bridge 23", which forms a raised portion in the side 31 of the sub-plate 12. Downstream of the passage opening 16 in front of the manifold zone 29 there is a weld joint 15, which joins the two sub-plates 11, 12 together.

Support points 20 are designed preferably like nubs, and (in the assembled state of the bipolar plate 10) are directed inwards. The support points which form depressions in the sub-plate 11, support the raised portion 23 on the bottom sub-plate 12. The fluid ports 14, 14', 14" are surrounded by a circumferential sealing groove 25 (sub-plate 11) and a sealing groove 26 (sub-plate 12), which runs partially offset to said former sealing groove. Other details in this respect are described in greater depth in the FIGS. 5 and 6.

A raised portion 35 is formed in front of the fluid channels 34, as seen from the central fluid port 14', on the sub-plate 11; and a bridge-like raised portion 35" is formed on the sub-plate 12. Immediately adjacent to the port 14', a raised edge 38 is formed on the sub-plate 12. In this case, too, the support points 20" to support the raised portion 35 at the sub-plate 11. When viewed from the fluid port 14', the fluid—preferably coolant—is distributed between the sub-plates 11 and 12 of the bipolar plate 10.

The respective fluid is conveyed initially from the corner-side fluid port 14" between the sub-plates 11, 12 to a passage opening 16", through which the fluid reaches the side 31 of the sub-plate 12, and then is distributed uniformly into the assigned fluid channels 34" via the manifold zone 29". The passage opening 16" is stabilized along its width with lands 27" and is configured in a flank of a raised portion 36". Upstream of the passage opening 16", a bridge 36 is formed in the sub-plate 11 as a raised portion in the side 30. At the fluid port 14" a raised portion 40 with inwards directed support points 20 is disposed on the sub-plate 11. Other support points 20", which form inward directed depressions in the sub-plate 12, support the raised portion 36" on the upper sub-plate 11.

The manifold zone 29 of the sub-plate 11 has a uniform configuration of raised, positive support points 41. In this case, of course, except for the edge-side support points 41, a negative support point 42 of the same type (which forms a free space between the positive support points 41 for the fluid) is formed inside the manifold zone 29 next to each raised, positive support point 41. It is advisable to provide a comparable configuration in the accumulation zone 50. The sub-plate 12 exhibits a corresponding structure in the manifold zone 29" with raised, positive support points 43 and negative support points 44.

The support points 41, 43 and 42, 44 are constructed as round or semi-spherical nubs. By virtue of the uniform distribution of positive and negative support points 41, 43 and 42, 44 (which are used, on the one hand, for the mechanical support, and, on the other hand, as the free space for the flowing fluid), the fluid distribution may be optimized so that the fluid channels 34 and/or 34" are supplied uniformly with fluid. Furthermore, the pressure loss is minimized by the gentle deflections of the curvatures, which are advantageous from a flow engineering viewpoint. The support points 41, 43 and 42, 44 are also production friendly structures for a preferred embossing of the sub-plates 11, 12.

Figure 2A:
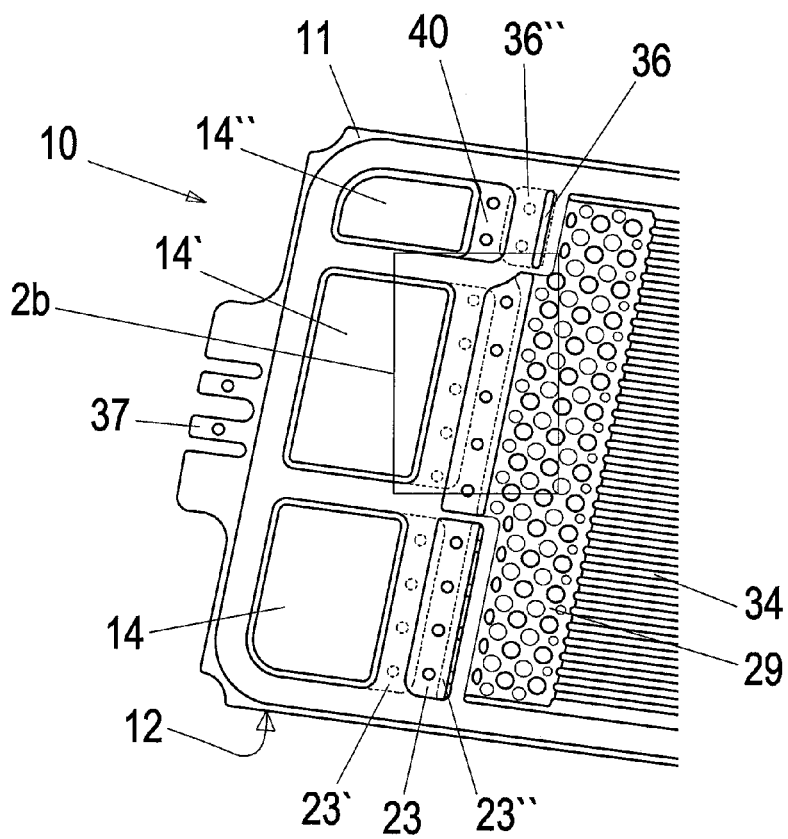
FIG. 2a is a top view which shows a detail of a preferred bipolar plate comprising a first and a second sub-plate.
Figure 2B:
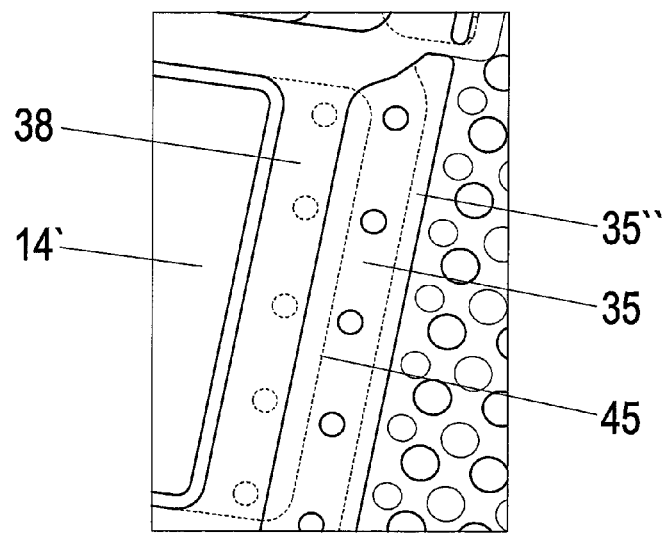

The FIGS. 2a and 2b provide a transparent view of the bipolar plate 10, where structures on and between the sub-plates 11, 12 can be perceived upon looking through. In order to illustrate the fluid guidance of the coolant between the sub-plates 11, 12, the fluid port 14' is enlarged (FIG. 2b) as a detail. Through this port the medium 45 flows between the raised edge 38 and the raised portion 35 in the interior of the bipolar plate 10.

The spatial arrangement of the various structures between the fluid ports 14, 14', 14" and the fluid channels 34 can be easily recognized here. A detailed description of these structures is included in the preceding descriptions of the figures.

Figure 3:
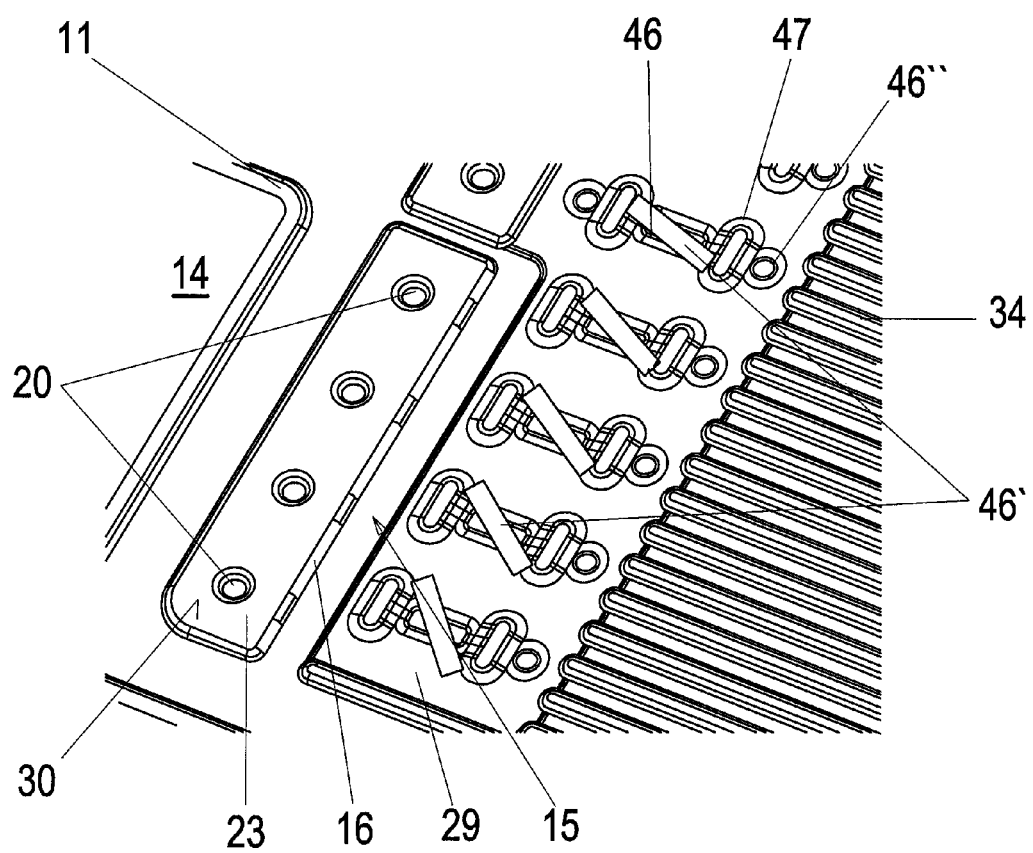
FIG. 3 depicts a preferred alternative configuration of the support points in a manifold zone.

FIG. 3 depicts a simplified embodiment of the structures for the distribution of fluid between a fluid port 14 and the fluid channels 34 as an example for the manifold zone 29 of the sub-plate 11. The support points 46 and/or 47 have a longitudinal, approximately elliptical cross section. Between adjacent pairs of raised support points 47 (which are aligned transversely to the fluid channels 34), the longitudinal support point 46 forms a depression that is aligned perpendicular to said two support points 47, and connects them together. The support points 46 form conducting lands for the fluid. The support points 47 (which are arranged in pairs and are connected by the support points 46) are located at the same distance to the fluid channels 34 of the bipolar plate, at equidistance next to each other from an edge of the direction from one edge of the bipolar plate 10 in relation to the opposite edge.

A round support point 46", formed as a depression, is also adjacent to the support point 47, facing the fluid channels 34.

An alternative to the configuration of the conducting lands 46' is indicated by means of bars. The conducting lands 46 of successive pairs of support points 47, which conducting lands define directing means, channeling means, or directing/channeling means, are arranged at a varying angles in relation to the fluid channels, in such a manner that the flowing fluid experiences a deflection in a preferred direction. The ellipsoidal support points 46, 47 are assigned preferably to fluid ports 14, 14" which are situated near a corner.

Figure 6:
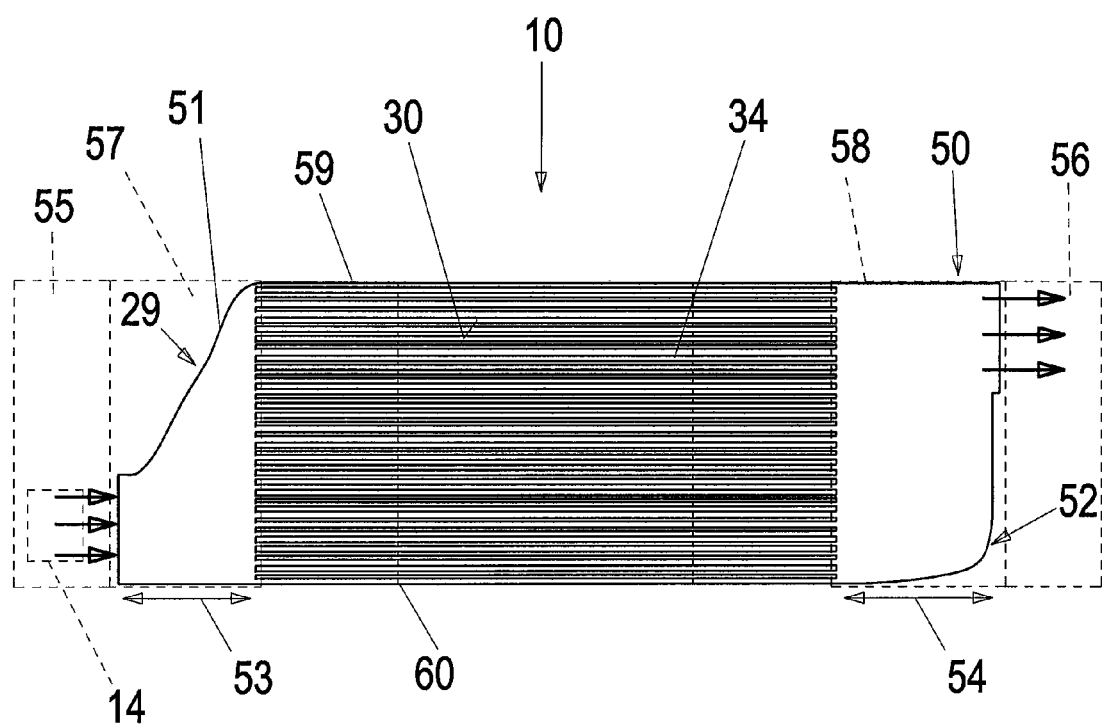
FIG. 6 is a schematic illustration of a preferred embodiment of the manifold zone and the accumulation zone.

FIG. 6 is a plan view of an advantageous further embodiment of the invention depicting a preferred bipolar plate 10. In this case the manifold zone 29 and the accumulation zone 50 of the bipolar plate 10 are asymmetrical to each other. It is desirable to design both sub-plates 11, 12 in the same way.

The bipolar plate 10 exhibits a fluid port area 55 and/or 56, which is indicated by dashed line at opposite ends of the bipolar plate. One fluid port 14 is indicated by a dashed line in the fluid port area 55. A so-called flow field with parallel fluid channels 34 (which are aligned parallel to the edges 59, 60 of the bipolar plate 10, and through which a fluid flows in a homogeneously distributed manner) extends between the fluid port areas 55, 56 on a side 30 of the sub-plate 11 of the bipolar plate 10. Between the fluid port areas 55, 56 and the fluid channels 34 there is a segment 57 and/or 58, which extends between two edges or sides 59, 60 of the bipolar plate 10. The manifold zone 29 is arranged in the segment 57 and the accumulation zone 50 is arranged in the segment 58. The direction of flow is indicated by arrows in the fluid port area 55, 56.

The manifold zone 29 is asymmetrical to the accumulation zone 50, and occupies a smaller area on the side 30 than the accumulation zone 50, which tapers off in the direction of flow. Both are sharply defined by an edge 51, 52 inside their segments 57, 58. In addition, the manifold zone 29 and the accumulation zone 50 include flow conducting structures, which convey the flow of the respective fluid into these areas. The respective edge 51, 52 of the manifold zone 29 and the accumulation zone 50 is contoured.

The manifold zone 29 fills approximately a triangular area, while the accumulation zone 50 almost fills the segment 58 and shows a slight curvature only on one side, which is adjacent to the same edge 60 as the fluid port 14, through which the fluid reaches the bipolar plate 10. If the fluid is conveyed in the appropriate manifold zone 29 with a cross flow to the fluid channels 34, the tapering of the cross section of the manifold zone can be clearly recognized. Furthermore, the width 53 of the manifold zone 29 along the edges 59, 60 is less than the width 54 of the accumulation zone 50. In general the goal is to minimize the width 53, 54 of the manifold zone 29 and the accumulation zone 50.

FIG. 4 is a sectional view through an inventive bipolar plate 10 according to a preferred further development of the invention. One of a plurality of such bipolar plates 10 separates two membrane electrode assemblies (MEA) respectively in a preferred fuel cell stack (not shown) and mechanically stabilizes the MEAs and the fuel cell stack altogether. The bipolar plate 10 consists of at least a first (cathode-side) sub-plate 11 and a second (anode-side) sub-plate 12, both of which are arranged with their sides 30, 31 in parallel to each other. A variety of structures are embossed in the sub-plates 11, 12, each of which comprises preferably a thin, embossed metal or metallic plate. Raised portions and depressions are embossed in the sub-plates 11 and 12.

The sub-plate 11 includes the upper side 30, which is situated externally, and the sub-plate 12 includes the bottom side 31, which is situated externally. The sub-plates 11, 12 enclose an interior 13. Furthermore, the edge area has at least one fluid port 14 arranged on at least one of the sides 30, 31, through which a fluid can be conveyed to the fluid channels. The fluid port 14 has a bead 21 and/or 23' in the direction of the respective sub-plate 11, 12.

A first fluid path segment 17 of the fluid extends from the fluid port 14 between the sub-plates 11 and 12 to a passage opening 16 of the sub-plate 11 (through which the fluid exits on the outer side 30 of the sub-plate 11 and flows over an adjacent second fluid path segment 18 on the side 30 of the respective sub-plate 11). From there the fluid, indicated by the arrows, flows into the fluid channels of the flow field area. The channels (not shown) are located on the side 30 in the direction of flow. On the sub-plate 12 a matching configuration with a passage opening is arranged so as to be offset in a practical way in relation to the arrangement of the sub-plate 11.

For example, the passage opening 16 is disposed upstream of a manifold zone 29 (over which the fluid can be fed to the fluid channels) and is distributed in such a manner that the fluid channels are supplied with the fluid in a homogeneous manner; and the fluid can be distributed uniformly into the fluid channels on the side 30 of the sub-plate 11. The passage area 16 can also be arranged expediently in an accumulation zone, from which the fluid from the fluid channels can be carried away. It is advisable to design the accumulation zone so as to match in order to guarantee a homogeneous distribution of the fluid into the fluid channels.

On the upper sub-plate 11, the fluid port 14 is surrounded by a circumferential sealing groove 25, while on the bottom sub-plate 12 it is surrounded by a circumferential sealing groove 26. The sealing groove 25 of the fluid port 14 on the one sub-plate 11 encloses a smaller area and extends in certain places inside the sealing groove 26 of the respective fluid port 14 on the other sub-plate 12 so that the two sealing grooves 25, 26 are offset in relation to each other. It is desirable that the offset conforms with the channel depth 33 between the sub-plates 11, 12 in order to guarantee a channel cross section that meets the minimum requirement.

The sealing groove 25 of the one sub-plate 11 is supported by a support point 20" of the other sub-plate 12, whereas the sealing groove 26 of the other sub-plate 12 is supported by a support point 20 of the sub-plate 11. The support structures 20, 20" are embossed into the respective sub-plate 12, 11 and project into the interior 13 of the bipolar plate 10.

The two sub-plates 11, 12 are permanently joined together by a weld joint 15, through which different fluids can be reliably separated from each other in accordance with the flow into or on the bipolar plate 10. The weld joint, is located outside an area 32, which is enclosed by the fluid port 14 and the passage opening 16, and is adjacent to the passage opening 16 in the direction of the interior 13 of the sub-plates 11, 12.

Figure 5:
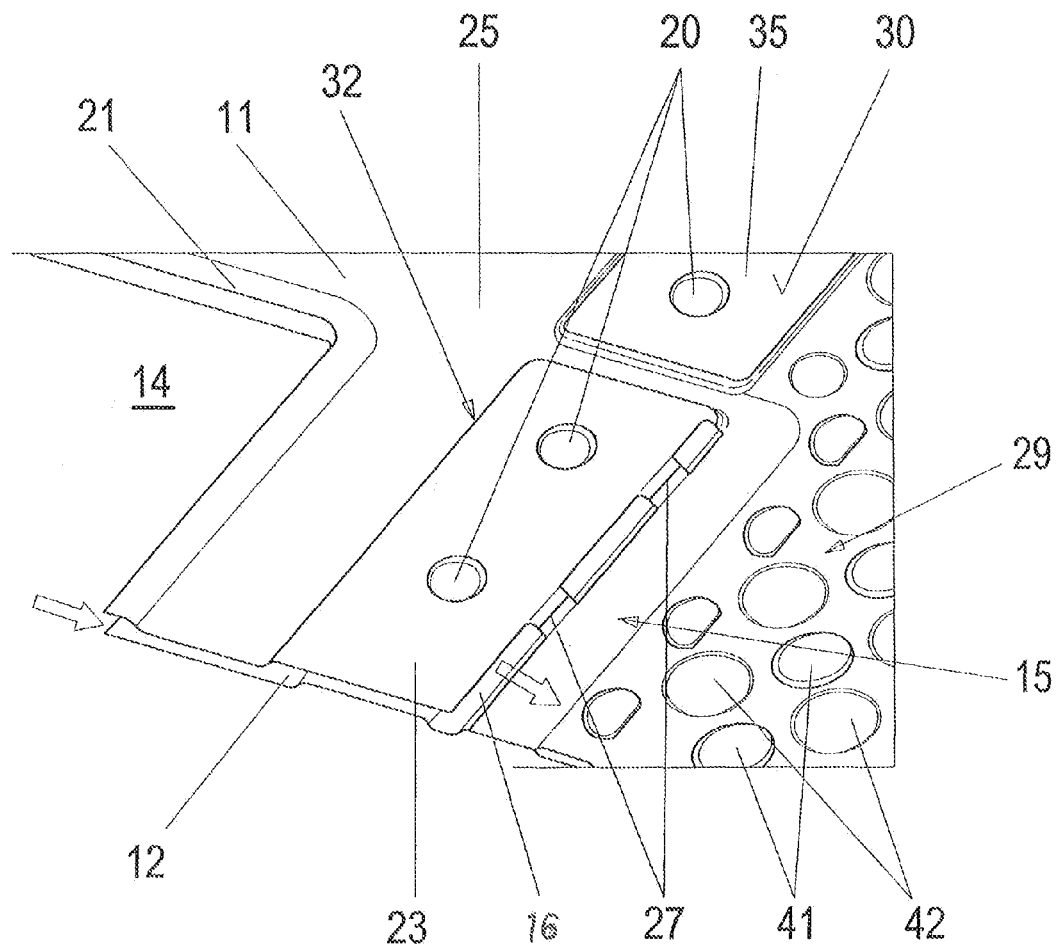
FIG. 5 is a perspective view of a partial section of the area from FIG. 4.

FIG. 5 is a detail of a perspective view of the bipolar plate 10 from FIG. 4. With respect to the description of identical elements, which are not explained, reference is made to the description of the FIGS. 1*a*, 1*b*, in order to avoid unnecessary repetition. The figure shows the fluid port 14, which is surrounded by a sealing groove 25, forming a depression in the sub-plate 11. The passage opening 16 is arranged in a flank of a raised portion 23 and exhibits lands 27 for stability purposes. The figure also shows support structures 20, which are embossed into the sub-plate 11 as the depressions that project into the interior 13 and which support the bottom sub-plate 12 in the area of its sealing groove 26 (in this case cannot be recognized) (FIGS. 1*a*, 1*b*). Furthermore, the figure shows a manifold zone 29 with positive and negative nubs 41, 42, assure that the fluid is distributed in a targeted way into the fluid channels of the flow field. The fluid channels (not shown) are adjacent to the manifold zone 29.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

what is claimed is:

1. A bipolar plate; for a fuel cell stack, said bipolar plate comprising:
    at least a cathode-side sub-plate and an anode-side sub-plate which are arranged parallel to each other, with upper and bottom sides that are located externally, and an interior that is enclosed by the sub-plates;
    a fluid port area arranged at an extremity of said bipolar plate, with at least one fluid port, over which a fluid can be conveyed to fluid channels, arranged on at least one of the sides;

a manifold zone disposed between the fluid port area and the fluid channels, over which said fluid can be distributed to fluid channels assigned thereto; and an accumulation zone through which the fluid can be conveyed from the fluid channels to another fluid port area; wherein, in at least one of the manifold zone and in the accumulation zone, at least one of the sub-plates has an arrangement of positive and negative support points, said positive support points being formed as raised areas in said at least one of said sub-plates, and said negative support points being formed as depressions and having an orientation opposite to that of the positive support points;

said support points have an elongated approximately elliptical cross section;

adjacent pairs of positive support points are aligned transversely to the fluid channels;

a longitudinally aligned negative support point is formed between each adjacent pair of positive support points and connects said adjacent pair of positive supports together; and in an assembled state of said bipolar plate said negative support points form free spaces between the positive support points for accommodating fluid flow.

2. The bipolar plate, as claimed in claim 1, the support points comprise nubs.

3. The bipolar plate, as claimed in claim 1, wherein the support points have an ellipsoid cross section.

4. The bipolar plate, as claimed in claim 3, wherein adjacent support points are arranged at a varying angle relative to the fluid channels, in such a manner that a flowing fluid deflected in a preferred direction.

5. The bipolar plate, as claimed in claim 3, wherein the ellipsoid support points are assigned to the fluid ports near corners of the bipolar plate.

6. The bipolar plate, as claimed in claim 1, wherein the support points are arranged such as to generate a higher flow resistance in the fluid port vicinity of an assigned fluid port than at a distance from the fluid port.

7. The bipolar plate, as claimed in claim 1 wherein flow of the fluid in said at least one of the manifold zone and the accumulation zone forms a flow that is substantially transverse in relation to the fluid channels.

8. The bipolar plate, as claimed in claim 7, wherein said at least one of the manifold zone and the accumulation zone tapers off in a direction of flow.

9. The bipolar plate, as claimed in claim 1, wherein the manifold zone and the accumulation zone are asymmetrical to each other.

10. The bipolar plate, as claimed in claim 1, wherein the manifold zone and the accumulation zone differ in size.

11. The bipolar plate, as claimed in claim 10, wherein the manifold zone occupies an area on the sub-plate which is smaller than the accumulation zone.

12. The bipolar plate, as claimed in Claim 1, wherein at least one of the sub-plates has a passage opening that permits fluid to pass through the interior, enclosed by the sub-plates, and the respective side.

13. The bipolar plate, as claimed in claim 12, wherein the passage opening is provided between at least one of i) the fluid port area and the manifold zone; and ii) the accumulation zone and an exit-side fluid port area.

14. The bipolar plate, as claimed in claim 1, wherein the at least one fluid port is surrounded by a circumferential sealing groove.

15. The bipolar plate, as claimed in claim 14, wherein the circumferential sealing groove of a fluid port on one of said sub-plates extends at least in part inside the sealing groove of a corresponding fluid port on the other sub-plate.

16. The bipolar plate, as claimed in claim 14, wherein a sealing groove of one sub-plate is supported by a support structure of the other sub-plate.

17. The bipolar plate, as claimed in claim 1, wherein a weld joint for joining the two sub-plates is located outside an area that is enclosed by the fluid port and a passage opening.

18. The bipolar plate, as claimed in claim 17, wherein a weld joint adjacent to the passage opening is arranged in a direction aligned with a direction of the fluid channels of the sub-plates.

19. A fuel cell stack comprising a layered arrangement of fuel cells, which are separated by bipolar plates according to claim 1.

* * * * *